(12) United States Patent
Thomas

(10) Patent No.: US 8,621,416 B1
(45) Date of Patent: *Dec. 31, 2013

(54) SYSTEM AND METHOD FOR ADAPTING SOFTWARE ELEMENTS BASED ON MOOD STATE PROFILING

(75) Inventor: Erikheath A. Thomas, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 340 days.

This patent is subject to a terminal disclaimer.

(21) Appl. No.: 13/037,099

(22) Filed: Feb. 28, 2011

Related U.S. Application Data

(63) Continuation of application No. 11/741,518, filed on Apr. 27, 2007, now Pat. No. 7,930,676.

(51) Int. Cl.
*G06F 9/44* (2006.01)
(52) U.S. Cl.
USPC .............................. 717/100; 717/120; 706/45
(58) Field of Classification Search
USPC ............... 717/100–102, 120–123; 706/45–49
See application file for complete search history.

(56) References Cited

U.S. PATENT DOCUMENTS

| | | | |
|---|---|---|---|
| 5,822,745 A | 10/1998 | Hekmatpour | |
| 5,977,968 A | 11/1999 | Le Blanc | |
| 5,987,415 A | 11/1999 | Breese et al. | |
| 6,260,035 B1 | 7/2001 | Horvitz et al. | |
| 6,385,763 B1 * | 5/2002 | Meyer et al. | 717/100 |
| 6,400,996 B1 * | 6/2002 | Hoffberg et al. | 700/83 |
| 6,405,364 B1 | 6/2002 | Bowman-Amuah | |
| 6,487,545 B1 | 11/2002 | Wical | |
| 6,513,026 B1 | 1/2003 | Horvitz et al. | |
| 6,581,204 B2 * | 6/2003 | DeBusk et al. | 717/120 |
| 6,731,307 B1 | 5/2004 | Strubbe et al. | |
| 6,785,663 B2 | 8/2004 | Wang et al. | |
| 6,845,499 B2 | 1/2005 | Srivastava et al. | |
| 6,912,517 B2 | 6/2005 | Agnihotri et al. | |
| 6,952,688 B1 | 10/2005 | Goldman et al. | |
| 6,965,855 B1 | 11/2005 | Burbridge et al. | |
| 7,062,752 B2 | 6/2006 | Simpson et al. | |
| 7,069,541 B2 | 6/2006 | Dougherty et al. | |
| 7,082,422 B1 | 7/2006 | Zirngibl et al. | |
| 7,092,928 B1 | 8/2006 | Elad et al. | |
| 7,139,999 B2 | 11/2006 | Bowman-Amuah | |

(Continued)

OTHER PUBLICATIONS

Mogadala et al, "Twitter User Behavior Understanding with Mood Transition Prediction", ACM, pp. 31-34, 2012.*

(Continued)

*Primary Examiner* — Anil Khatri
(74) *Attorney, Agent, or Firm* — Osha Liang LLP

(57) ABSTRACT

Various embodiments of a system and method for adapting software elements based on mood state profiling are described. The system and method for adapting software elements may include a mood state component configured to, among other things, create a mood state profile of a user. The mood state profile may indicate characteristics of a user's mood state. The system and method for adapting software elements based on mood state profiling may also include a method of application development. The method of application development may include creating an application profile that indicates the mood-altering characteristics of the application. The application profile may be used to, among other things, determine modifications to the application during the application development phase. The mood state component may also enable applications to adapt to a user's mood state while the application is in use (e.g., at runtime).

33 Claims, 12 Drawing Sheets

(56) References Cited

U.S. PATENT DOCUMENTS

| | | | |
|---|---|---|---|
| 7,236,963 | B1 | 6/2007 | LaMuth |
| 7,562,059 | B2 | 7/2009 | Scarborough et al. |
| 7,607,119 | B2 * | 10/2009 | Chilimbi et al. ............. 717/101 |
| 7,669,177 | B2 | 2/2010 | Gerber et al. |
| 7,689,542 | B2 * | 3/2010 | Yoaz et al. ............. 707/999.003 |
| 7,689,919 | B2 * | 3/2010 | Abbott et al. ................. 715/740 |
| 7,720,784 | B1 * | 5/2010 | Froloff ............................. 706/47 |
| 7,788,207 | B2 | 8/2010 | Alcorn et al. |
| 7,917,888 | B2 * | 3/2011 | Chong et al. ................. 717/102 |
| 7,937,357 | B2 * | 5/2011 | Serra et al. ...................... 706/52 |
| 7,996,814 | B1 * | 8/2011 | Qureshi et al. ................ 717/120 |
| 8,001,527 | B1 * | 8/2011 | Qureshi et al. ................ 717/120 |
| 8,032,481 | B2 * | 10/2011 | Pinckney et al. .............. 706/62 |
| 8,122,434 | B2 * | 2/2012 | Kostadinov et al. .......... 717/121 |
| 8,195,598 | B2 * | 6/2012 | Hua et al. ......................... 706/62 |
| 8,250,519 | B2 * | 8/2012 | Budko et al. ................. 717/100 |
| 8,494,978 | B2 * | 7/2013 | Pinckney et al. ............... 706/11 |
| 2006/0293921 | A1 | 12/2006 | McCarthy et al. |

OTHER PUBLICATIONS

Leitner et al, "Mobile Multimedia: Identifying User Values Using the Means-End Theory", ACM, pp. 167-176, 2008.*

Likamwa et al, "MoodScope: Building a Mood Sensor from Smartphone Usage Patterns", ACM, pp. 389-401, 2013.*

Saari et al, "Psychologically Targeted Persuasive Advertising and Product Information in E-Commerce", ACM, pp. 245-254, 2004.*

Lisetti, C. L., et al., "MAUI: a Multimodal Affective User Interface", ACM, Dec. 1, 2002, 10 pages.

Zhang, Y., "Using Bayesian Priors to Combine Classifiers for Adaptive Filtering", SIGIR '04, Jul. 25, 2004, 8 pages.

Martin-Bautista, M. J. et al., "Building Adaptive User Profile by a Genetic Fuzzy Classifier with Feature Selection", IEEE, May 7, 2000, 5 pages.

Castro, J. F., et al., "Mood State and Recall Biases: The Role of Affect", Psychology in Spain, vol. 2, No. 1, Jan. 1, 1998, 8 pages.

* cited by examiner

FIG. 6A

| characteristic 600a | characteristic 600b | ... | characteristic 600n |
|---|---|---|---|
| value 610a | value 610b | ... | value 610n |

FIG. 6B

| tension-anxiety | anger-hostility | ... | confusion-bewilderment |
|---|---|---|---|
| 25 | 60 | ... | 70 |

⎫
⎬ user's mood state
⎭

FIG. 7A

| characteristic 700a | characteristic 700b | ... | characteristic 700n |
|---|---|---|---|
| effect 710a | effect 710b | ... | effect 710n |

FIG. 7B

| tension-anxiety | anger-hostility | ... | confusion-bewilderment |
|---|---|---|---|
| +20 | +25 | ... | −40 |

⎫
⎬ mood effect of a particular path
⎭

FIG. 8A

| characteristic 800a | characteristic 800b | ... | characteristic 800n |
|---|---|---|---|
| anticipated value 810a | anticipated value 810b | ... | effect 810n |

FIG. 8B

| tension-anxiety | anger-hostility | ... | confusion-bewilderment |
|---|---|---|---|
| 45 | 85 | ... | 30 |

⎫
⎬ anticipated mood state
⎭

| characteristic 900a | characteristic 900b | ... | characteristic 900n |
|---|---|---|---|
| condition 910a | condition 910b | ... | condition 910n |

{ conditions for success for a particular path

*FIG. 9A*

| tension-anxiety | anger-hostility | ... | confusion-bewilderment |
|---|---|---|---|
| below 40 | below 50 | ... | below 45 |

*FIG. 9B*

Interview Application Display 1200

Describe how you currently feel by assessing the following statements:

1.) I feel energetic.  ☐ Not at all  ☐ Somewhat  ☐ Extremely
2.) I feel tense.  ☐ Not at all  ☐ Somewhat  ☐ Extremely
3.) I feel annoyed.  ☐ Not at all  ☐ Somewhat  ☐ Extremely prompt 1210

[previous] [next]

SYSTEM AND METHOD FOR ADAPTING SOFTWARE ELEMENTS BASED ON MOOD STATE PROFILING

CROSS-REFERENCE TO RELATED APPLICATIONS

This application is a continuation of U.S. patent application Ser. No. 11/741,518, filed on Apr. 27, 2007, and entitled: "SYSTEM AND METHOD FOR ADAPTING SOFTWARE ELEMENTS BASED ON MOOD STATE PROFILING." Accordingly, this application claims benefit of the filing date of U.S. patent application Ser. No. 11/741,518 under 35 U.S.C. §120. U.S. patent application Ser. No. 11/741,518 is hereby incorporated in its entirety.

BACKGROUND

An individual's mood state may significantly impact their intellectual and physical performance. For example, when an individual feels sad or depressed, they may experience forgetfulness or feel lethargic. Similarly, when an individual feels happy or content, they may experience heightened mental acuity or feel energetic. In some cases, an individual's mood state may impact their evaluation of products (and/or services) irrespective of the actual quality or efficacy of the particular product or service. For example, an individual in a positive mood state may view the efficacy of a particular product as satisfactory. Similarly, the individual may view the efficacy of the same product as unsatisfactory when in a negative mood state.

Some products are designed to assist users with tasks that are prone to inducing negative mood states. Due to this characteristic, these products may be inherently disadvantaged at maintaining a high level of user satisfaction. For instance, the efficacy of a product designed to assist an individual in the completion of a confusing or complicated task may be viewed negatively by the individual due to a negative mood state induced by the task. One example of such a product is a tax preparation application that assists users with the completion and filing of tax returns. In many cases, users may view tax preparation as, among other things, stressful, confusing, and/or frustrating. Accordingly, the efficacy of tax preparation applications may be viewed negatively by the user due to the mood state induced by the task of tax preparation. Typically, applications do not monitor a user's mood state nor adapt in response to fluctuations in a user's mood state.

SUMMARY

Various embodiments of a system and method for adapting software elements based on mood state profiling are described. The system and method for adapting software elements may include a mood state component configured to, among other things, create a mood state profile of a user. The mood state profile may indicate characteristics of a user's mood state. For example, the mood state profile may indicate whether a user is experiencing, among other things, tension, anxiety, and/or confusion.

The system and method for adapting software elements based on mood state profiling may also include a method of application development. The method of application development may include creating an application profile that indicates the mood-altering characteristics of the application. In some cases, the method of application development may include utilizing the mood state component to profile an application by monitoring a user's mood state, as well as fluctuations in the mood state, while one or more test users are using the application. For instance, if a user's mood state indicates that the user(s) are experiencing extreme anxiety while using a particular portion of the application, the method may include determining that the particular portion of the application is predisposed to inducing anxiety. The application profile may be used to, among other things, determine modifications to the application during the application development phase.

The mood state component may enable applications to adapt to a user's mood state while the application is in use. The mood state component may create, update, and monitor a user's mood state profile and adjust elements of the application accordingly. For example, the mood state component may determine from a user's mood state profile that a user is experiencing confusion while using the application. In response, the mood state component may adapt elements of the application in order to reduce or eliminate the confusion experienced by the user. For instance, the mood state component may modify questions such that the questions contain more context information for the user. Various other application modifications may be implemented in response to a user's mood state, according to the descriptions herein.

BRIEF DESCRIPTION OF THE DRAWINGS

FIG. 6A-6B illustrate an exemplary format of a mood state profile.

FIG. 7A-7B illustrate an exemplary format for the mood altering effects of an application segment.

FIG. 8A-8B illustrate an exemplary format for an anticipated mood state.

FIG. 9A-9B illustrate an exemplary format for success conditions of a particular application segment.

FIG. 12-13 illustrate an exemplary displays containing mood state profiling questions.

Figure 1:
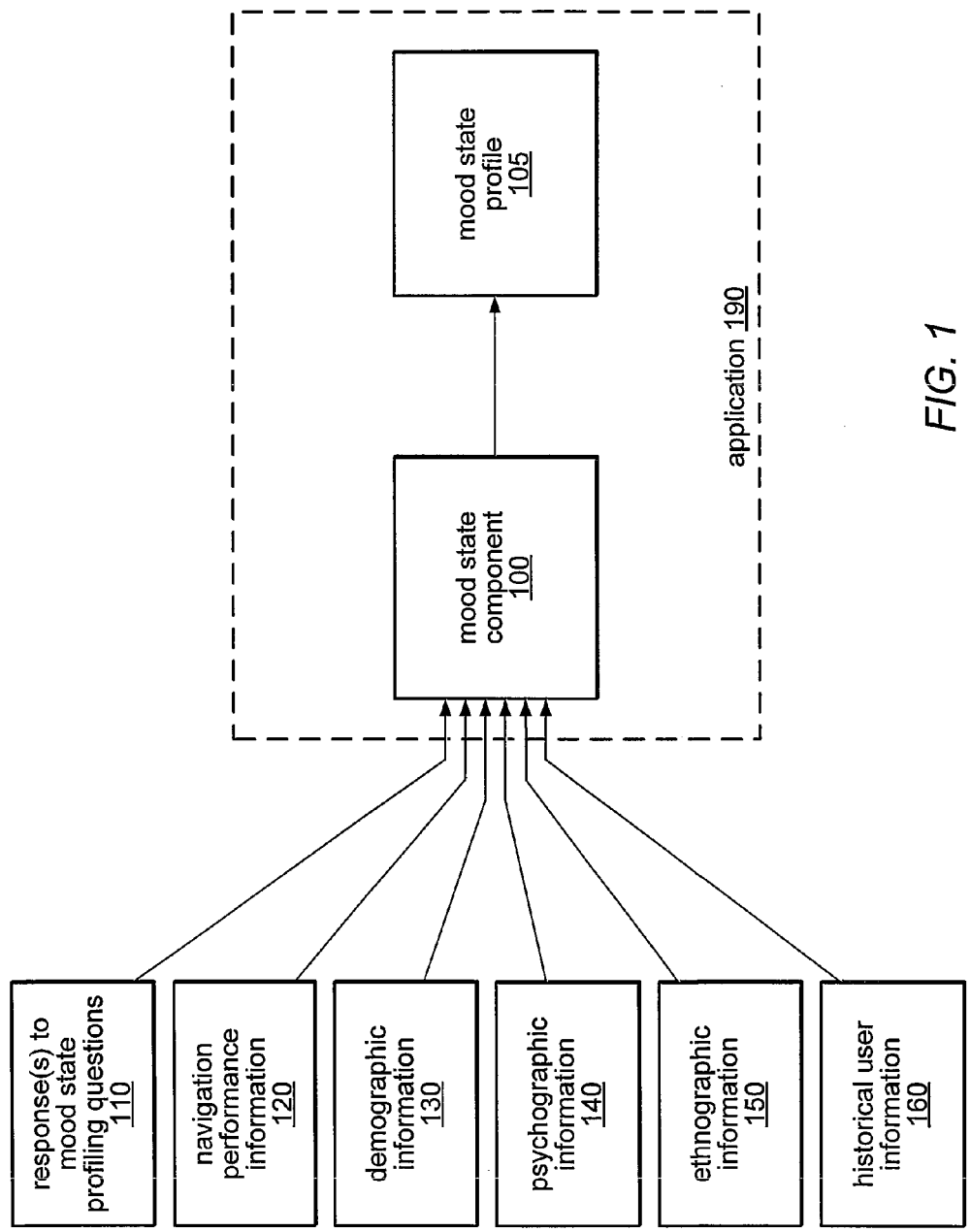
FIG. 1 is a data flow diagram illustrating one embodiment of a mood state component, as described herein.

While the system and method for adapting software elements based on mood state profiling is described herein by way of example for several embodiments and illustrative drawings, those skilled in the art will recognize that the system and method for adapting software elements based on mood state profiling is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for adapting software elements based on mood state profiling as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for adapting software elements based on mood state profiling are described. The system and method for adapting software elements may include a mood state component configured to, among other things, create a mood state profile of a user. The mood state profile may indicate characteristics of a user's mood state. For example, the mood state profile may indicate whether a user is experiencing, among other things, tension, anxiety, and/or confusion.

The system and method for adapting software elements based on mood state profiling may also include a method of application development. The method of application development may include creating an application profile that indicates the mood-altering characteristics of the application. In some cases, the method of application development may include utilizing the mood state component to profile an application by monitoring a user's mood state, as well as fluctuations in the mood state, while the user is using the application. For instance, if a user's mood state indicates that the user is experiencing extreme anxiety while using a particular portion of the application, the method may include determining that the particular portion of the application is predisposed to inducing anxiety.

In many cases, the method may include profiling interview-based applications. Typically, interview-based applications present a user with a series of displays that ask the user to, among other things, answer questions and/or complete tasks. Interview-based applications may present information to a user in a step-by-step approach such that a few questions or tasks are completed before the next group of questions or tasks is presented to the user. In some cases, interview-based applications may culminate in the completion of a larger task. In this manner, interview-based applications may assist users with large and sometimes complex tasks by breaking up a task into smaller, more manageable tasks. In some cases, interview-based applications may be primarily dialogue-based applications. In other words, a large portion of the application may contain extensive dialogue between the application and the user. Additionally, in some cases, interview-based applications may be applications that are used infrequently such that users do not typically "learn" the application.

Once such example of an interview based application is a tax preparation application. Tax preparation applications may ask users to complete one or more questions and/or tasks, such as providing income information (e.g., information from Form W-2), personal information (e.g., name, address, social security number), and deduction information (e.g., charitable contributions or donations). The questions and/or tasks may be presented to the user through one or more displays that each contains some portion of the interview. Once the user has provided the necessary answers and information, the tax preparation application may create a tax return and, in some cases, electronically file the tax return with a taxing authority.

In addition to facilitating application profiling during application development, the mood state component may enable applications to adapt to a user's mood state while the application is in use. The mood state component may create, update, and monitor a user's mood state profile and adjust elements of the application accordingly. For example, the mood state component may determine from a user's mood state profile that a user is experiencing confusion while using the application. In response, the mood state component may adapt elements of the application in order to reduce or eliminate the confusion experienced by the user. For instance, the mood state component may modify questions such that the questions contain more context information for the user. Another example may include the mood state component dividing a single question into smaller, more manageable questions so that the user is required to evaluate less information for a given question. Various other application modifications may be implemented in response to a user's mood state, according to the descriptions below.

Mood State Component

An exemplary mood state component is illustrated by mood state component 100 of FIG. 1. Mood state component 100 may access information associated with a user, such as items 110-160, and create a mood state profile, such as mood state profile 105, from the information. In many cases, mood state component 100 may be implemented as an embedded feature of an application, such as an interview-based application. In other cases, mood state component 100 may be implemented as an add-on to an existing application (e.g., via a plug-in or application extension).

Mood state profile 105 may include, among other things, a snapshot of a user's transient emotional state. In many cases, the user's transient emotional state may be determined from information about the user such as items 110-160 described below. Mood state profile 105 may represent a user's transient emotional state in a variety of ways. In some case, mood state profile 105 may include one or more mood subscales. Common mood subscales may include, but are not limited to, tension, depression, anger, vigor, fatigue, and confusion. In various embodiments, mood state profile 105 may use information about the user, such as items 110-160, to populate values for the various mood subscales of mood state profile 105. In some cases, quantitative values (e.g., numbers, percentages, and/or scales) may be used to represent the mood subscales. In other cases, qualitative values, such as "high", "medium", "low", may be used within the mood state profile to represent the value of mood subscales.

The information that mood state component 100 may use to create mood state profile 105 may include responses to mood state profiling questions, such as responses to mood state profiling questions 110. In most cases, the mood state profiling questions may be posed to the user by the mood state component, such as through the user-interface of an application in which the mood state component is implemented, such as application 190. In general, a mood state profiling question may include any question presented to a user in order to obtain information about the user's mood state. For example, one question might include "how are you feeling right now?" Another question might pertain to a specific feeling, such as "are you feeling anxious?" or "are you feeling confused?" In some cases, a mood state profiling question may direct a user to provide an assessment, such as an assessment of statements about the user. For instance, mood state component 100 may ask the user to evaluate the statement "I feel uneasy" or "I feel energetic." In which case the user may provide a response 110 such as "yes" or "no." In other cases, responses to mood state profiling questions 110 may be have varying granularity. For example, the user may rate the accuracy of the statement "I feel uneasy" on a numerical scale, such as scale of 1-10 (e.g., 1 for not uneasy and 10 for very uneasy). Numerous other questions designed to obtain mood state information from a user will be apparent to one skilled in the art of mood states.

Figure 13:
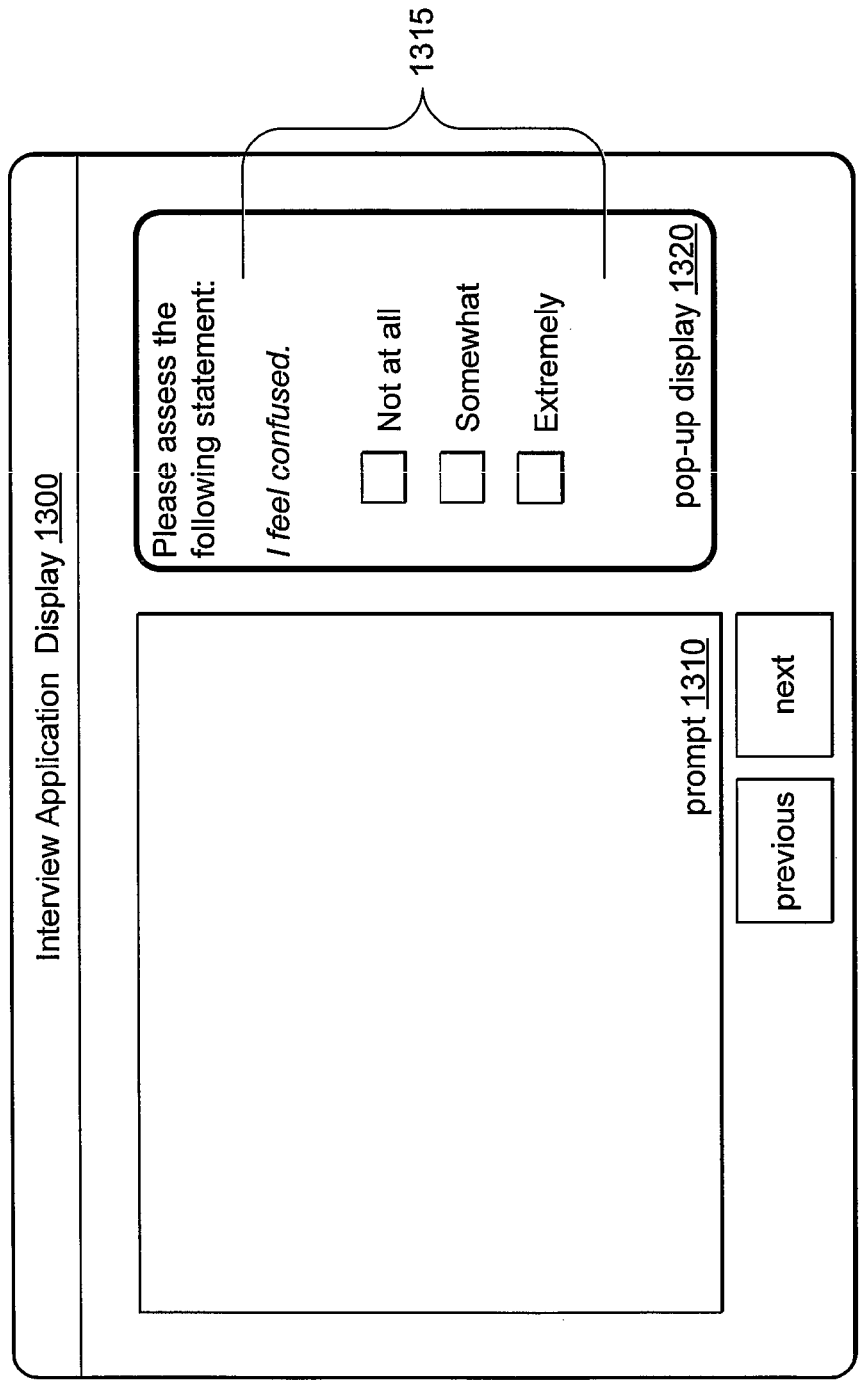

In various embodiments, responses to mood state profiling questions 110 may be user-supplied responses to mood state profiling questions that have been validated against known mood state profiling scales. Examples of such questions are included in various clinical assessment tools including, but not limited to, the Profile of Mood States (POMS), the Beck Anxiety Inventory (BAI), and the Positive and Negative Affect Schedule (PANAS). Examples of some similar mood state profiling questions are illustrated in FIG. 12 and FIG. 13 described below. One skilled in the art of mood states will be familiar with the POMS, BAI and PANAS as well as additional clinical assessment tools containing mood state profiling questions that have been validated against known mood state profiling scales.

The responses to mood state profile questions 110 may provide an indication of a user's mood state. Mood state component 100 may use this information to create mood state profile 105. For example, if the user responds to the question "how are you feeling?" with the answer "confused" (or a similar response) this information may be incorporated into mood state profile 105. In some cases, responses to mood state profiling questions may be quantified (if not already in a quantified form). For example, mood state component 100 may quantify a response of "confused" by converting the response to a level of confusion. For instance, a response of "confused" may be mapped to a level of confusion of "50" whereas a response of "very confused" may be mapped to a higher level of confusion, such as "100."

In various embodiments, particular mood state profiling questions may be mapped to mood subscales of mood state profile 105. For example, a question such as "are you feeling unable to relax?" may be mapped to an anxiety mood subscale. The user's response to the mood state profiling questions, such as responses 110, may also be mapped to mood subscales of mood state profile 105. For example, if the user responds to "are you feeling unable to relax?" with "extremely," a mood subscale (e.g., an anxiety subscale) of mood state profile 105 may be updated to incorporate the user's response. In this manner, mood state component 100 may aggregate responses to mood state profiling questions 110 into mood state profile 105 such that mood state profile 105 provides an indication of a user's transient emotional state. As mood state component 100 receives more information, such as responses 110, the mood state component may update mood state profile 105. In this way, mood state profile 105 may provide an up-to-date view of a user's transient emotional state.

The mood state component may also collect information about a user's application navigation performance, such as navigation performance information 120. Navigation performance information 120 may include navigation performance characteristics such as click-through rate, linger rate, retrace rate, repeat rate, help access rate and other navigation performance aspects.

Click-through rate may include a measure of the rate at which the user navigates through a series of displays. For instance, to complete a particular task in an interview-based application, a user may need to complete a series of interview screens or displays. If the user successfully completes the series of screens quickly, this may indicate a high click-through rate. Similarly, if the user slowly navigates from screen to screen, this may indicate a low click through rate. Click through rate may provide an indication of a user's mood. For example, a high click through rate may indicate that the user is successfully completing the questions or tasks in an interview-based application. The successful completion of tasks and questions may indicate that a user is in a positive mood state and mood state component 100 may update mood state profile 105 accordingly (e.g., by adjusting one or more mood subscales, values, and/or variables). Similarly, a low click through rate may indicate that the user is having difficulty with the questions of tasks of the application and possibly experiencing, among other things, frustration, anger, and/or confusion. Accordingly, mood state component 100 may update mood state profile 105 to reflect a more negative mood state (e.g., by adjusting one or more mood subscales, values and/or variables).

Linger rate may include a measure of the time a user lingers on one or more displays, questions, tasks, buttons, controls, icons, or any other element of a display (e.g., a display of an interview-based application). For example, a long linger rate on a particular question may indicate negative mood state elements, such as high levels of confusion, frustration, tension, anger and other mood elements. Similarly, a short linger rate may indicate low levels of confusion, frustration, tension, anger, and other mood elements. Accordingly, mood state component 100 may update mood state profile 105 according to the linger rate (e.g., by adjusting one or more mood subscales, values, and/or variables).

Retrace rate may include a measure of a user's tendency to visit previously accessed displays. For example, interview based applications may present one or more paths (including one or more displays) to a user. For example, in tax preparation applications, one path may correspond to submitting a Form W-2 or entering contact information. A high retrace rate may indicate that the user is frequently navigating through paths that the user has already navigated. In many cases, this behavior may provide insight into the user's mood state. For example, a high retrace rate may indicate that the user is, among other things, confused, frustrated and/or anxious. Similarly, a low retrace rate may indicate that the user is not, among other things, confused, frustrated, and/or anxious. Mood state component may update mood state profile 105 according to the retrace rate, such as through the adjustment of one or more mood subscales, values, and/or variables.

Repeat rate may include a measure of the user's tendency to repeat the same or a similar set of actions. For instance, in some cases, repeat rate may include a measure of the user's tendency to repeat the same or similar actions within a display such as accessing various interface elements including, but not limited to, menus, controls, checkboxes, buttons, text entry fields, and other interface elements. In some cases, high repeat rate may indicate that the user is, among other things, confused, frustrated and/or anxious. Similarly, a low repeat rate may indicate that the user is not, among other things, confused, frustrated, and/or anxious.

Help access rate may include a measure of the number of times a user accesses a help function of the application including, but not limited to, a help menu, wizard, or index of help topics. Help access rate may provide insight into a users mood state. For example, a high help access rate may indicate that a user is, among other things, confused, frustrated, and/or anxious. Similarly, a low help access rate may indicate that a user is not confused, frustrated, and/or anxious. Mood state component 100 may update mood state profile 105 to reflect the user's current help access rate, such as through the adjustment of one or more mood subscales, values, and/or variables.

The mood state component may also access demographic information about the user, such as demographic information 130. Demographic information 130 may include, but is not limited to, age, gender, marital status, number of children, and other demographic characteristics. For example, mood state component 100 may present a user with a demographic survey display and receive corresponding responses from the user in order to determine various demographic characteristics about the user. For example, if the mood state component 100 determines (e.g., through a demographic survey) that the user is single with no children, the mood state component may determine that the user may be less susceptible to stress and other negative mood state characteristics. This determination may be stored in mood state profile 105. In many cases, the demographic determinations made by the mood state component may be stored in mood state profile 105 for use by the application in which the mood state component is implemented. In some cases, mood state component 100 may update mood state profile 105 to reflect the mood characteristics associated with the user's demographic characteristics, such as through the adjustment of one or more mood subscales, values, and/or variables.

Mood state component 100 may also access psychographic information, such as psychographic information 140. Psychographic information 140 may include information pertaining to, among other things, a user's personality, values, attitude, interests, or lifestyle. In many cases, psychographic characteristics may provide insight into one or more mood state characteristics which may be stored in mood state profile 105. In many cases, mood state component 100 may prompt the user for psychographic information 140, such as through a survey display or by asking the user a series of questions. For example, if mood state component 100 is implemented within a tax preparation application, mood state component 100 may prompt the user for the information pertaining to the user's tax history. For instance, mood state component 100 may ask the user "have you ever filed taxes before?" Typically, if a user has never filed taxes before, the user may be more susceptible to, among other things, anxiety and confusion during the tax interview process. For example, the user may be unfamiliar with the types of questions presented during a tax interview which may cause the user to feel, among other things, anxious.

Ethnographic information, such as ethnographic information 150, may also be accessed by mood state component 100. For example, mood state component 100 may present a survey (or form or other display configured for the submission of information) to collect ethnographic information from the user. Ethnographic information 150 may include information about the user's goals, such as what the user expects to achieve with the application within which mood state component 100 is implemented. For example, if mood state component 100 is implemented within a tax preparation application, the user may indicate ethnographic information such as "I would like to maximize my tax deductions" or "I would like to minimize my capital gains." In response, mood state component 100 may adjust mood state profile 105 to reflect the user's ethnographic information. For example, a user with complex tax goals may, in most cases, have previously filed taxes before. This may indicate that the user is more comfortable with certain tax topics, and the application may present less "novice" information to the user without the user becoming tense or anxious. Accordingly, mood state profile 105 may be adjusted to lower the user's anxiety level. In various embodiments, mood state component 100 may adjust one or more mood subscales in response to detecting particular ethnographic information.

Mood state component 100 may also access historical user information about a user, such as historical user information 160. Historical user information 160 may include information about the user's previous experience(s) with the application in which mood state component 100 is implemented. For example, if mood state component 100 is implemented within a tax preparation application, historical user information 160 may include information about the user's previous tax preparation sessions (e.g., tax filings from previous years), such as sections of the tax preparation with which the user experienced difficulty. In various embodiments, historical user information 160 may include historical information or data related to items 110-150.

In some embodiments, additional items not illustrated within FIG. 1, such as other information indicative of a user's mood state, may be utilized by the mood state component to create a mood state profile for one or more users. In various embodiments, mood state component 100 may not require that all items 110-160 be accessible in order to create a mood state profile for one or more users. Indeed, in some cases, a single item may be sufficient to create a mood state profile. Furthermore, FIG. 1 is illustrated as a logical representation of an exemplary implementation of a mood state component; the location of each item relative to other items may differ in various embodiments. Additionally, while the mood state component is largely described herein in terms of embedded functionality of a particular application (including plug-ins and application extensions), in some cases, the mood state component may be a separate application altogether.

Application Profiling

Figure 2:
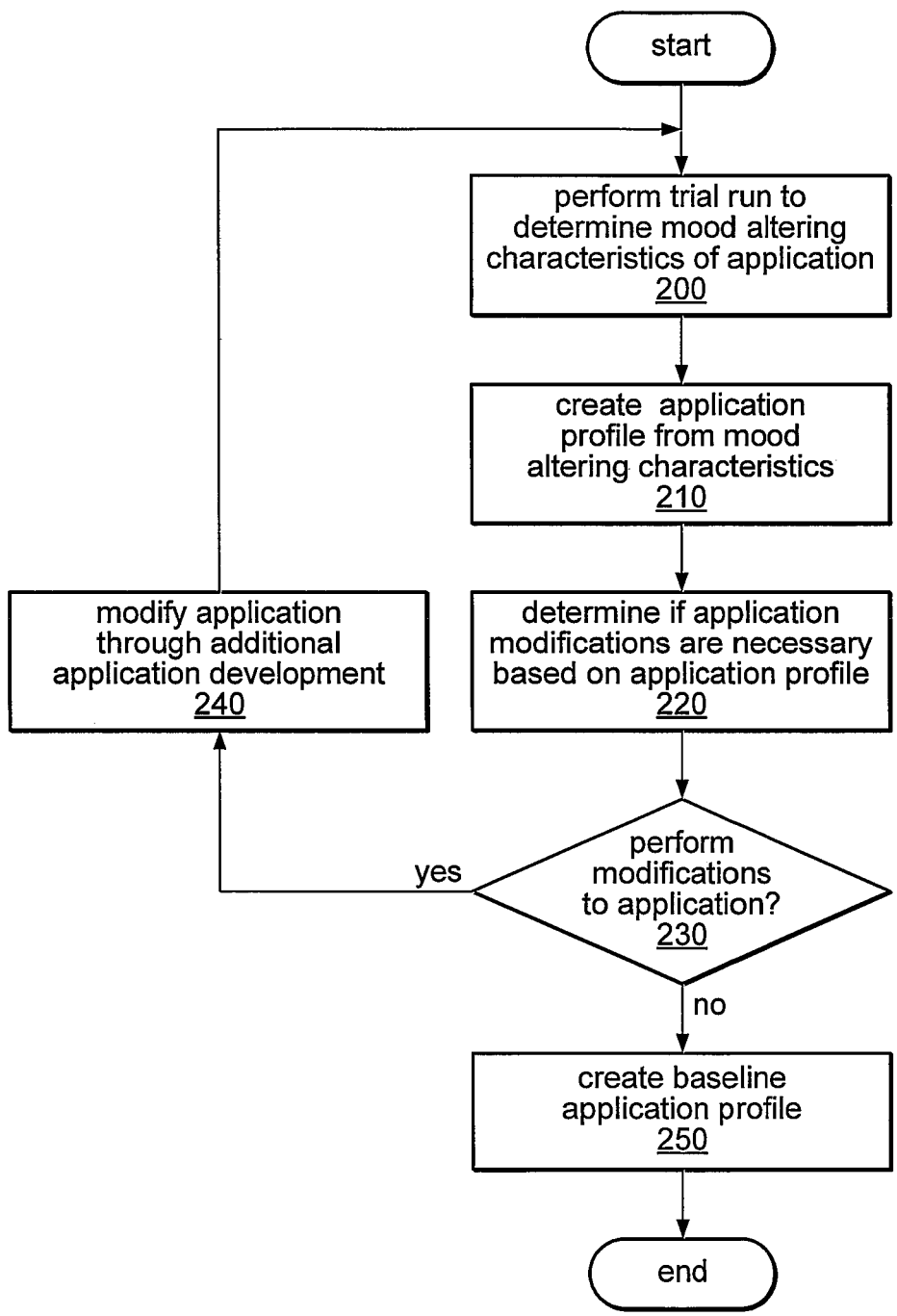
FIG. 2 is a flowchart illustrating an exemplary method for creating an application profile.

An exemplary method for creating an application profile is illustrated by FIG. 2. In general, application profiles indicate the mood altering characteristics of a particular application. In many cases, the method described may be performed during the application development phase of an application lifecycle. Moreover, the method described may be performed during the testing phase (e.g., end-user testing) of application development. In various embodiments, the method may include using a mood state component, such as mood state component 100, to determine mood altering characteristics, as described in more detail below. In various embodiments, the method may include creating an application profile for interview-based applications, such as a tax preparation application. The application for which the application profile is being created may be referred to herein as the application under test.

The method may include performing a trial run to determine mood altering characteristics of the application, as illustrated by block 200. Performing the trial run may include engaging one or more users in a trial run of a prototype version of the application in order to determine the mood altering characteristics of the application. The mood altering characteristics may be determined according to how the application affects each user's mood. For example, if a particular portion of the application induces anxiety in one or more users, the particular portion may have an anxiety-inducing characteristic. In various embodiments, direct observation may be employed during the trial run to determine mood altering characteristics of various portions of the application. Direct observation may include verbally asking the one or more users mood state profiling questions before, during and after they use the application. For example, the trial run administrator may ask the user questions such as "how are you feeling?" or "how does this make you feel?" throughout various points within the application. The user's responses may provide insight into the mood altering characteristics of the application. For example, if the user is using a difficult portion of the application, the user may describe that they are feeling, among other things, frustrated and confused. Direct observation may further include observing the user for nonverbal mood indicators, such as body language (e.g., posture, gestures, and facial expressions). For example, if the user is using a portion of the application with which they are experiencing anxiety, the user may exhibit restlessness or become fidgety. Since users tend to be more candid and forthcoming with information when speaking aloud, the trial run administrator may, in some cases, ask each user to verbalize their feelings or mood while using the application. The user's reactions, both verbal and nonverbal, may be used to determine the mood altering characteristics of the application. In various embodiments, performing the trail run may include the trial run administrator employing directed storytelling to determine how the user felt during a particular portion of the application. In other words, the trial run administrator may have the user(s) complete a portion of the application and, afterwards, review the task with the user. During this review, the user(s) may explain the feelings they experienced during the particular portion of the application. For example, if the portion of the application under review was particularly simple or unchallenging (e.g., entering contact information), the user may express feeling highly confident or full of vigor.

Performing the trial run may also include using standardized measures, such as the POMS, BAI, PANAS, and other clinical assessment tools, to determine how the user feels during a particular task (e.g., entering Form W-2 information in a tax preparation application) of the application. In some cases, evaluating how the user feels during a task may provide more accurate results than evaluating how the user feels after a particular task. For example, many users may experience a negative mood (e.g., characterized by confusion, anger, anxiety) during a difficult task yet experience a positive mood (e.g., characterized by a confidence and a sense of accomplishment) after completing the task.

In various embodiments, performing the trial run may include accessing various mood indicators, such as the information described above in regard to FIG. 1, including, but not limited to, responses to mood state profiling questions and navigation performance information. In many cases, a mood state component, such as mood state component 100, may be implemented within (or in conjunction with) the application to be profiled in order to determine the user's mood state throughout the use of the application. For example, the users participating in the trial run may use the application while the mood state component tracks and records the users' mood state throughout the process. As results for each user are aggregated, a comprehensive view of the application's mood altering characteristics may be realized. The aggregated results may be used to determine "trouble spots" or points within the application that have particular negative mood state inducement qualities. For example, in a tax preparation application, the mood state component may determine that 90% of users experienced an increase in anxiety (or another mood state characteristic) during a particularly difficult portion of the tax interview (e.g., a portion pertaining to a complex tax topic). In other words, performing the trial run may provide results that indicate the various mood altering qualities of the application under test.

The application's mood altering characteristics may be used to create an application profile as illustrated by block 210. The application profile may be divided into one or more portions that correspond to portions of the application under test. Each portion may be characterized by one or more mood altering characteristics. For example, one portion of the application profile may correspond to a confusing portion of the application under test. For instance, if the application under test is a tax preparation application, a difficult portion of the tax preparation application (e.g., Form 8801: determining credit for prior year minimum tax) may induce a negative mood state in the user characterized by characteristics (e.g., confusion, anxiety, anger) determined in step 200. Accordingly, the application profile may include a corresponding portion that indicates the negative mood state inducing characteristics of that particular portion of the application under test. In various embodiments, the mood altering characteristics of the application under test may be represented quantitatively within the application profile. For example, for a particular segment of the application under test, the application profile may indicate that "this application segment increases user anxiety by 20 points" or "this application segment increases confusion by 30 points." In other words, for each segment of the application, the application profile may indicate how that particular segment affects the mood state of a user using the application.

In some cases, one or more segments of the application under test may need to undergo modifications due to adverse mood altering characteristics. Block 220 illustrates determining if the application under test should be modified based on the results within the application profile. In other words, if the application profile indicates that a particular segment of the application under test is particularly troublesome (e.g., severely and negatively affects users' mood states), the trial run administrator may determine that this segment of the application under test requires modification in order to correct the mood altering characteristics of the particular segment. In various embodiments, the method may include utilizing various thresholds to determine whether or not application modifications are necessary. In some cases, such thresholds may be performance based. For example, if a certain percentage of users (e.g., 90%) successfully complete the particular segment of the application, the method may include determining that no modification to the particular segment of the application under test is necessary. In some embodiments, the thresholds may be based on the mood altering characteristics of a particular segment of the application. For example, a threshold may indicate that "a user's anxiety level should not rise by 20 points in any given segment." Thus, if the application causes a user's anxiety level (or a group of users, such as the trial run population) to rise by more than 20 points, the method may include determining that application modifications are necessary.

As illustrated by the positive output of block 230, if modifications to the application are necessary, the method may include modifying the application through additional application development in order to change one or more mood altering characteristic (e.g., reducing or eliminate one or more negative mood altering characteristics). If modifications to the application are necessary, the method may include performing such operations as illustrated by block 240. For instance, if the application profile indicates that a particular portion of the application has highly negative mood altering qualities (e.g., induces high levels of anxiety and confusion), additional application development may serve to correct or reduce such qualities. For example, if an application segment induces severe anxiety, the application may be modified to present information such that more context information is presented to the user through a larger number of displays. For example, a simple question may be expanded to provide more context (e.g., background) information to the user. However, large amounts of text on a single screen may also induce anxiety in some users. Therefore, modifying the application to include more context information within a particular question or task may include dispersing the information across a larger number of displays. One such example is described below in regard to FIG. 11.

In various embodiments, the visual layout of the application may be modified. For example, colors of the user interface may be modified (e.g., pink and other pastel colors may have calming effects on users). Another example may include underlining or bolding particular elements of a display (e.g., important words or other items) to bring the user's attention to important elements in order to reduce confusion. Modifying the visual layout may include simplifying the interface elements of a given display. For example, in some cases, only buttons, icons, and other interface elements essential to the particular task at hand (e.g., entering tax deduction information in a tax preparation application) may be present on any given display of the application. Additionally, the size of interface elements may be modified. For example, enlarging buttons, icons and other graphical user interface (GUI) elements may have a calming effect on the user. The method may also include modifying the ordering of questions. For example, if a particular segment of the application increases anxiety, questions may be reordered to help build the user's confidence. For instance, reordering questions so that the simplest questions are presented to the user first may help reduce user anxiety by building up the user's confidence with small, relatively easy tasks. Modifying the application may also include eliminating or expanding questions as well as altering question style, tone, and/or content. For example, if the application profile indicates that a particular segment of the application is prone to inducing anger or hostility, modifying the application may include changing the tone of the segment to a more calming, soothing tone in order to reduce anger and hostility.

After one or more modifications are performed, the method may include performing another trial run and (e.g., by proceeding to block 200), updating or creating a new application profile (e.g., block 210), and determining if additional modifications to the application are necessary (e.g., block 220). This process may iterate until it is no longer necessary to perform modifications (e.g., all thresholds have been met at block 230) or until no significant improvement is being made between iterations (i.e., additional modifications are not improving mood altering qualities of the application). Accordingly, the method may proceed as illustrated by the negative output of block 230. In various embodiments, a baseline application profile may be created as illustrated by block 250. In some embodiments, the baseline application profile may be the application profile of the last iteration of the method according to the latest modifications. In other words, the baseline application profile may be an application profile of the most recent version of the application (e.g., the version of the application incorporating all modifications performed in step 240). Accordingly, the baseline application profile may provide a comprehensive record of the mood altering characteristics of each segment of the application under test.

While an application profile may facilitate the performing of modifications during the application development phase, the application profile may also, in conjunction with a mood state component, facilitate the modification of an application during runtime, as described below.

Real-Time Adaptation of Software Elements

In various embodiments, a mood state component, such as mood state component 100, may use a baseline application profile, such as described in regard to FIG. 2, to adapt software elements of an application (e.g., an interview-based application) in response to a user's mood state. For example, if the mood state component detects that the user is experiencing anxiety or anger, the mood state component may alter the GUI of the application to calm the user. For example, the mood state component may change the colors of the GUI to calming colors, such as pink or other pastel colors. Other modifications will be described in more detail below.

Figure 3:
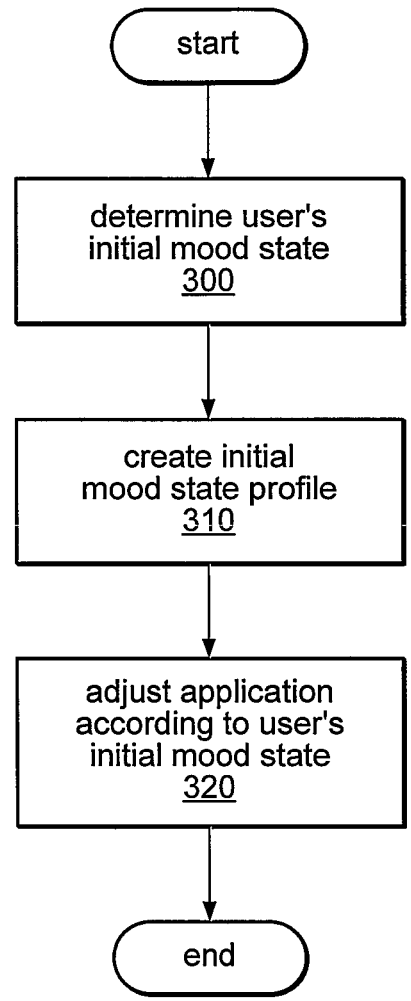
FIG. 3 is a flowchart illustrating an exemplary method of adjusting an application based on a user's initial mood state.

When a user begins an application, such as an interview-based application, the user typically has a preexisting mood state. For example, the user may have an initial mood state characterized by calmness, frustration, anxiety, vigor, or any other mood state quality. FIG. 3 illustrates an exemplary method of determining the user's initial mood state and altering an application according to the initial mood state. The method described herein may be implemented by a mood state component, such as mood state component 100. As illustrated by block 300, the method may begin by determining a user's initial mood state. Typically, this step may be carried out after the user initially launches the application. For example, if the application were a tax preparation application, determining the user's initial mood state may occur after the user launches the application but before the user begins the tax interview process. In various embodiments, a mood state component, such as mood state component 100 may determine a user's initial mood state. The mood state component may utilize any of the various techniques described in regard to FIG. 1 in order to determine a user's mood state. For example, to determine the user's initial mood state, the mood state component may present the user with various mood state profiling questions, surveys, or other interrogative techniques to determine the user's initial mood state. In some cases, such interrogative techniques (e.g., mood state surveys) may be optional. For instance, if the user wishes to begin using the application immediately, the user's mood state may worsen if not given the chance to forgo such initial interrogative steps.

The method may also include creating an initial mood state profile from the user's initial mood state, as illustrated by block 310. The initial mood state profile may indicate various mood state characteristics that define the user's mood state at the beginning of application use. Such mood state characteristics may include, but are not limited to, the various mood state subscales outlined by standard mood state clinical assessment tools such as the POMS, BAI, and PANAS. As described above, such subscales may include, but are not limited to, tension, depression, anger, vigor, fatigue, and confusion. In some cases, the mood state profile may provide qualitative evaluations of each mood state characteristic within the mood state profile. For example, the mood state profile may indicate that a user is experiencing a "high" level of anxiety. In other cases, the mood state profile may provide quantitative representations of each mood state characteristic. For example, the mood state profile may indicate that the user's "level of anxiety" is rated at "95." One example of a quantitative representation of a mood state profile is described below in regard to FIG. 6.

The method may further include adjusting the application's initial or base configuration after an initial mood state profile has been created for the user, as illustrated by block 320. For instance, if the initial mood state profile indicates that the user is experiencing highly negative mood state qualities (e.g., high levels of anxiety and confusion), the application may need to be adjusted in order to correct or reduce such qualities. For example, if the initial mood state profile indicates the user is experiencing severe anxiety, the application may be modified to present information such that more context information is presented to the user through a larger number of displays. For example, a simple question may be expanded to provide more context (e.g., background) information to the user. However, large amounts of text on a single screen may also induce anxiety in some users. Therefore, adjusting the application to include more context information within a particular question or task may include dispersing the information across a larger number of displays. One such example is described below in regard to FIG. 11.

In various embodiments, the visual layout of the application may be adjusted. For example, colors of the user interface may be modified (e.g., pink and other pastel colors may have calming effects on users). Another example may include underlining or bolding particular elements of a display (e.g., important words or other items) to bring the user's attention to important elements in order to reduce the users level of confusion. Adjusting the visual layout may include simplifying the interface elements of a given display. For example, in some cases, only buttons, icons, and other interface elements essential to the particular task at hand (e.g., entering tax deduction information in a tax preparation application) may be present on any given display of the application. Additionally, the size of interface elements may be modified. For example, enlarging buttons, icons and other graphical user interface (GUI) elements may have a calming effect on the user. The method may also include modifying the ordering of questions. For example, if a particular segment of the application increases anxiety, questions may be reordered to help build the user's confidence. For instance, reordering questions so that the simplest questions are presented to the user first may help reduce user anxiety by building up the user's confidence with small, relatively easy tasks. Adjusting the application may also include eliminating or expanding questions as well as altering question style, tone, and/or content. For example, if the mood state profile indicates the user is experiencing anger or hostility, adjusting the application may include changing the tone of the application to a more calming, soothing tone in order to reduce anger and hostility.

Figure 4:
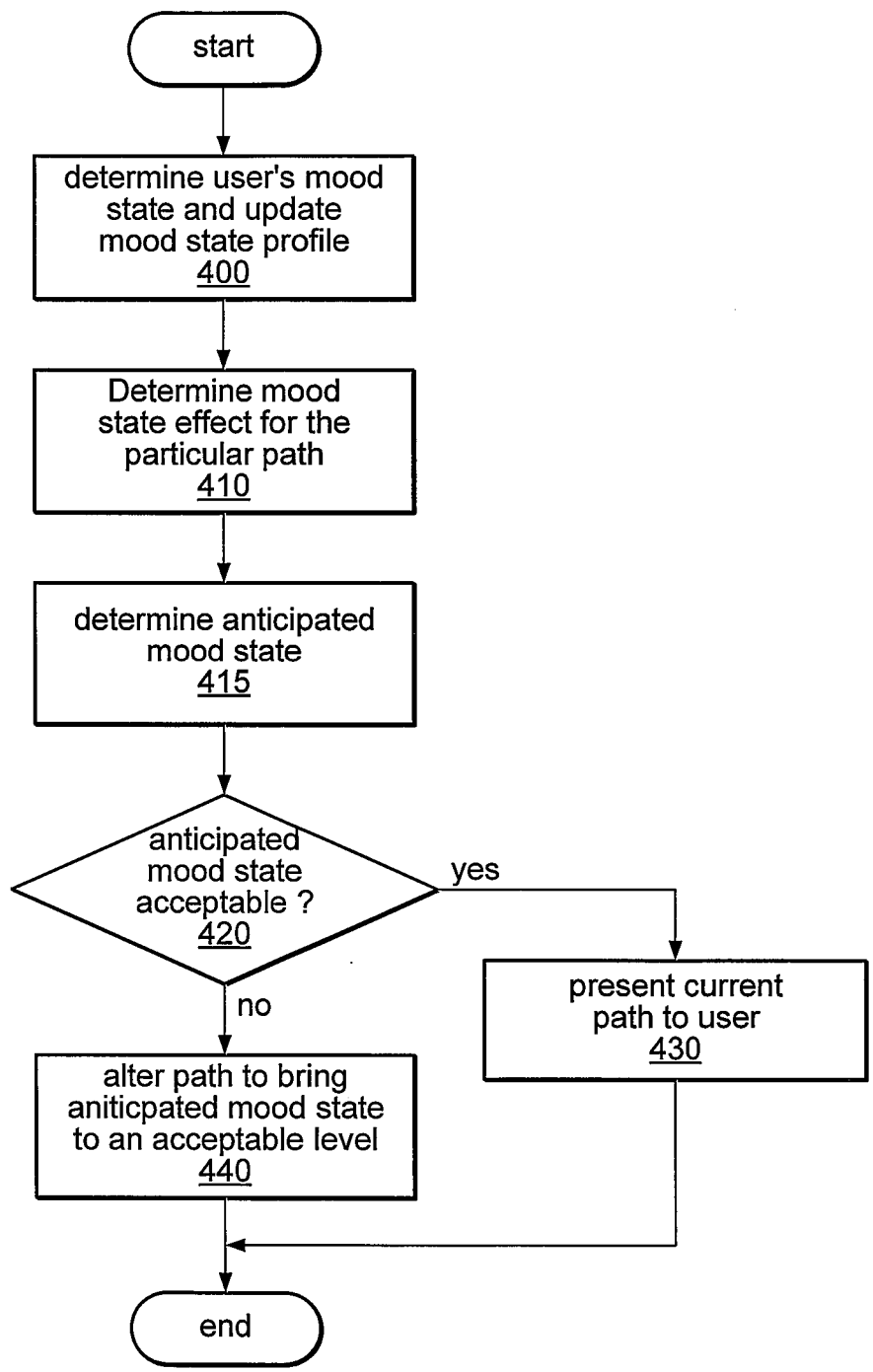
FIG. 4 is a flowchart illustrating an exemplary method for altering application navigation paths based on a user's mood state.

Typically, after the application has been initially adjusted for the user's initial mood state, the user may continue with normal application use. For example, if the application is a tax preparation application, the user may begin the tax interview process. An exemplary method of altering an application during runtime in response to a user's mood state is illustrated by FIG. 4. The method described herein may be implemented by a mood state component, such as mood state component 100. Additionally, the application described may be an application in which the mood state component is embedded, such as application 190. Furthermore, the following descriptions may collectively refer to FIGS. 4-9B.

The method may begin with determining the user's mood state, as illustrated by block 400. In various embodiments, a mood state component, such as mood state component 100 may determine the user's mood state. The mood state component may utilize any of the various techniques described in regard to FIG. 1 in order to determine a user's mood state. For example, to determine the user's mood state, the mood state component may present the user with various mood state profiling questions, surveys, or other interrogative techniques to determine the user's mood state. In some cases, such interrogative techniques (e.g., mood state surveys) may be optional. For instance, if the user wishes to use the application free of interruption, the user's mood state may worsen if not given the chance to forgo such interrogative steps.

The method may also include creating or updating a mood state profile of the user's mood state. The mood state profile may indicate various mood state characteristics that define the user's mood state. Such mood state characteristics may include, but are not limited to, the various mood state subscales outlined by standard mood state clinical assessment tools such as the POMS, BAI, and PANAS. As described above, such subscales may include, but are not limited to, tension, depression, anger, vigor, fatigue, and confusion. In some cases, the mood state profile may provide qualitative evaluations of each mood state characteristic within the mood state profile. For example, the mood state profile may indicate that a user is experiencing a "high" level of anxiety. In other cases, the mood state profile may provide quantitative representations of each mood state characteristic. For example, the mood state profile may indicate that the user's "level of anxiety" is rated at "95." FIG. 6A illustrates an exemplary mood state profile format with multiple characteristics 600a-600n (collectively referred to herein as characteristic 600). For each characteristic 600, there exists a value, such as values 610a-610n (collectively referred to herein as value 600), that indicates the current level of the mood state characteristic. These values may be determined by a mood state component, such as mood state component 100, as described above in regard to FIG. 1. FIG. 6B illustrates an exemplary instance of a mood state profile having the format illustrated by FIG. 6A. For example, FIG. 6B illustrates that the user has a tension-anxiety level of 25 points.

The method of FIG. 4 may include determining the mood state effect for the particular path, as illustrated by block 410. In other words, before, during or shortly after a user accesses a particular path (or segment, e.g., a series of displays in an interviewbased application) of the application, the method may include determining (or, in some cases, estimating) how that particular path of the application will affect the user's mood state. In various embodiments, a mood state component, such as mood state component 100, may determine a mood state effect for the particular path of the application by accessing a baseline application profile of the application, such as the baseline application profile described above in regard to FIG. 2. As described above, the baseline application profile may indicate, for each path of the application, one or more mood altering characteristics. FIG. 7A illustrates an example format of information that may be found in a baseline application profile, which indicates mood altering characteristics for a particular path. More specifically, characteristics 700a-700n (collectively referred to herein as characteristic 700) may each indicate a particular mood altering effect, such as effects 710a-710n (collectively referred to herein as effect 710).

FIG. 7B illustrates an exemplary instance of mood effect information having the format of FIG. 7A. For example, the mood effect information indicates that the respective path typically increases tension-anxiety by 20 points. Similarly, the same path also decreases confusion-bewilderment by 40 points. Determining the mood state effect may include accessing mood effect information, such as that of FIGS. 7A-7B, from a baseline application profile.

The method may continue with determining an anticipated mood state, as illustrated by block 420. In various embodiments, determining an anticipated mood state may include determining (or, in some cases, predicting) what the user's mood state will be at the completion of the particular path. In one embodiment, determining the anticipated mood state for a particular path may include accessing mood state information for the user (e.g., the mood state information of FIG. 6A-6B), accessing mood effect information (e.g., the mood effect information of FIG. 7A-7B), and applying (e.g., summing or subtracting) the mood effect to the mood. For example, FIG. 8A illustrates an exemplary format of anticipated mood state information, which includes mood state characteristics 800a-800n (collectively referred to herein as characteristic 800). Each characteristic may have anticipated values, such as anticipated values 810a-810n (collectively referred to herein as value 810). For instance, determining an anticipated mood state may include applying effect 710 to value 610 in order to determine an anticipated value 810. For example, FIG. 8B illustrates the results of applying the mood state effects of FIG. 7B to the mood state values of FIG. 6B. For example, tension-anxiety may be predicted to increase 20 points (as indicated by FIG. 7B) from a value of 25 points (as indicated by FIG. 6B) to a value of 45 points (e.g., 20 points+ 25 points), as illustrated by FIG. 8B.

The method may further include determining if the anticipated mood state is acceptable, as illustrated by block 420. In various embodiments, determining if the anticipated mood state is acceptable may include accessing one or more conditions for successful completion of a particular path. The conditions may each correspond to a particular mood characteristic (e.g., tension-anxiety) and provide a condition for a user's successful completion of the respective path (e.g., "tension-anxiety must be below 40 points"). One example of such conditions is illustrated in FIG. 9A, which includes mood characteristics 900a-900n (collectively referred to herein as characteristic 900) each of which may correspond to characteristics 800a-800n. The conditions for successful completion of a particular path may include conditions 910a-910n. FIG. 9B illustrates an exemplary representation of the format of FIG. 9A. For example, FIG. 9B illustrates that the mood characteristic tension anxiety of the user's mood state profile must remain below 40 points in order to successfully complete the particular path. Determining if the anticipated mood state is acceptable may include comparing evaluating anticipated mood values, such as the anticipated values of FIG. 8B, to conditions for successful path completion, such as the conditions of FIG. 9B. For example, the anticipated tension-anxiety value of 45 violates the condition of "below 40 points." Similarly, the anticipated confusion-bewilderment value of 30 meets the condition of "below 45 points."

Figure 5:
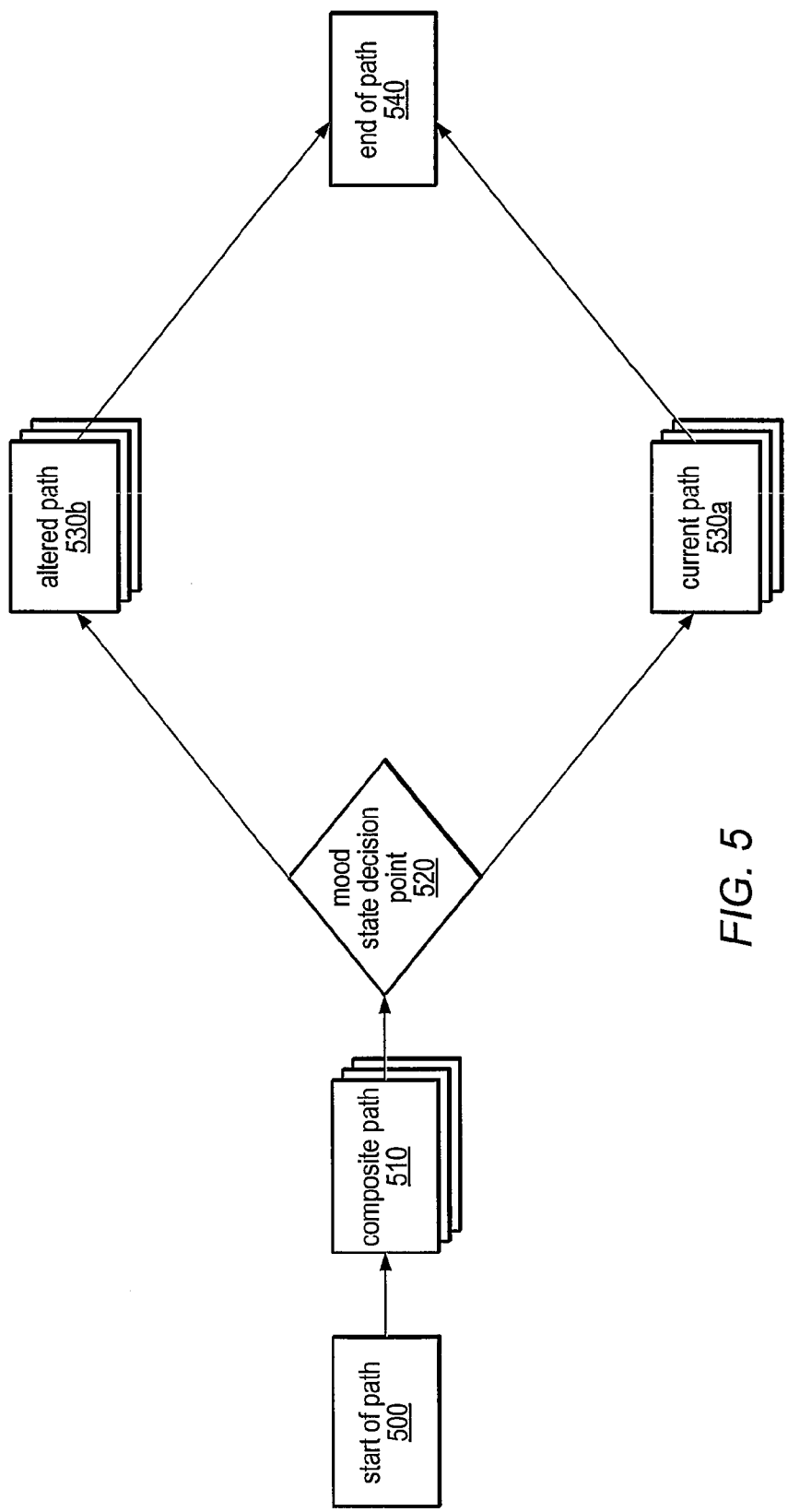
FIG. 5 is a logical representation of altering an application navigation path based on a user's mood state.

If no anticipated mood values are determined to be in violation of the conditions for successful completion, the method may include determining that the mood state is acceptable as illustrated by the positive output of block 420. In this case, the method may proceed and present the current path to the user as normal. However, if one or more of the anticipated mood values are determined to be in violation of the conditions for successful completion, the method may include altering the navigational paths to bring (or attempt to bring) the anticipated mood state to an acceptable level, as illustrated by block 440. FIG. 5 illustrates one example of altering a navigation path to include an altered path designed to bring the anticipated mood state to an acceptable level. As illustrated, a particular path may include starting point, such as start of path 500, and an ending point, such as end of path 540. A given application may have multiple paths interconnected, such as the interconnected paths of an interview based application. Within a particular path, there may be one or more paths, such as composite path 510, that may include, for example, one or more displays of an interview based application. A given path may be broken down into one or more path segments, such as the path segment from mood state decision point 520 to the end of path 540. Typically, the route to the end of path 540 would include navigating through current path 530a. However, in some cases, it may be determined (e.g., at block 420 of FIG. 4) that the current path 530a may produce an unacceptable anticipated mood state for a user navigating through the path. In this case, the altered path may be implemented within the application (e.g., by the mood state component) such that the user will traverse the altered pathway 530b instead of path 530a. The altered pathway 530b may be selected such that the conditions for successful completion (e.g., conditions 900) are not violated. In other words, the mood altering effects of altered path 530b may prevent the user's mood state characteristics (as determined from the mood state profile) from violating the conditions for successful completion. For example, if the current pathway 530a violates the tension-anxiety condition, altered path 530b may include a tension-anxiety lowering path, such as a path that presents more information to the user at a slower pace. One such example is described below in regard to FIG. 11.

Figure 10:
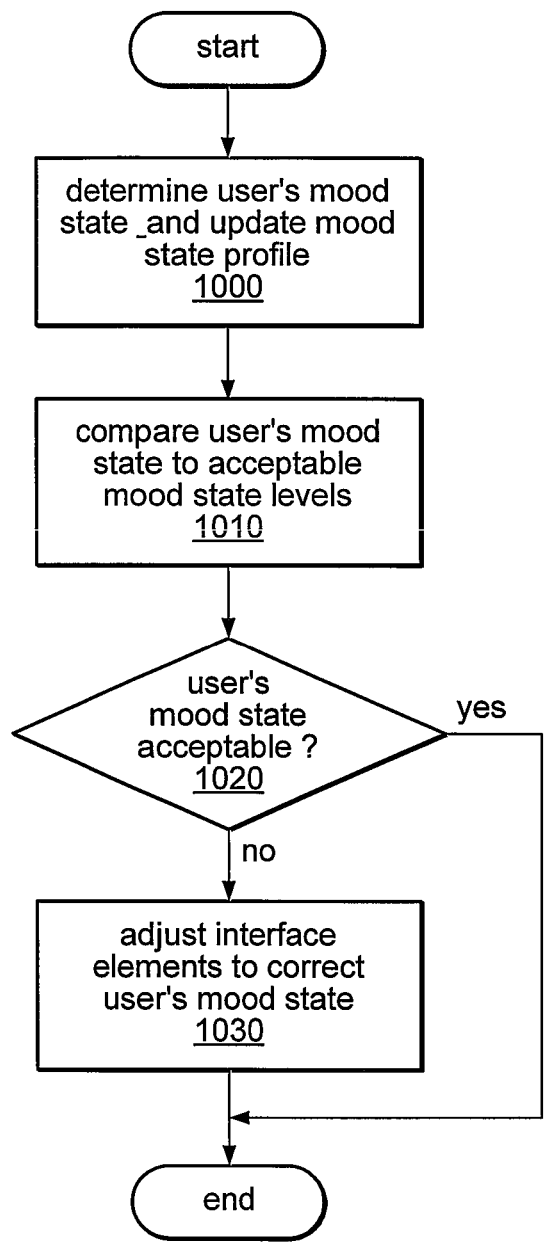
FIG. 10 illustrates is a flowchart illustrating an exemplary method for altering interface elements based on a user's mood state.

Another exemplary method of altering an application during runtime in response to a user's mood state is illustrated by FIG. 10. Unlike the method of FIG. 4, the method of FIG. 10 may not be primarily path based. In other words, instead of altering the navigation paths of the application, the method may include adjusting path independent features, such as the applications interface elements. The method of FIG. 10 may be implemented by a mood state component, such as mood state component 100. The method may include determining the user's mood state, such as through any of the various methods described above (e.g., via accessing the user's mood state profile), as illustrated by block 1000. The method may further include comparing the user's mood state (as indicated by the mood state profile) to acceptable mood state levels. In various embodiments, the acceptable mood state levels may be accessed from a baseline application profile, such as the baseline application profile described in regard to FIG. 2. For example, the acceptable mood state levels may be levels that are necessary for successful completion of the application as determined from user testing, such as during application profiling. The acceptable mood state levels may indicate acceptable levels for the various mood state characteristics of a mood state profile. For example, the acceptable mood state levels may indicate that tension-anxiety should not exceed 80 points while the user is using the application. If the user's mood state is acceptable (i.e., no mood state characteristics of the user's mood state profile violate the acceptable mood state levels), the application may proceed without alteration, as indicated by the positive output of block 1020.

If the user's mood state is not acceptable, as illustrated by the negative output of block 1020, the method may include adjusting the user interface elements of the application in order to correct (or reduce the negative mood state elements of) the user's mood state, as illustrated by block 1030. Adjusting the interface elements of the application may include adjusting the visual layout of the application. For example, colors of the user interface may be modified (e.g., pink and other pastel colors may have calming effects on users). Another example may include underlining or bolding particular elements of a display (e.g., important words or other items) to bring the user's attention to important elements in order to reduce the users level of confusion. Adjusting the visual layout may include simplifying the interface elements of a given display. For example, in some cases, only buttons, icons, and other interface elements essential to the particular task at hand (e.g., entering tax deduction information in a tax preparation application) may be present on any given display of the application. Additionally, the size of interface elements may be modified. For example, enlarging buttons, icons and other graphical user interface (GUI) elements may have a calming effect on the user. The method may also include modifying the ordering of questions. For example, if a particular segment of the application increases anxiety, questions may be reordered to help build the user's confidence. For instance, reordering questions so that the simplest questions are presented to the user first may help reduce user anxiety by building up the user's confidence with small, relatively easy tasks. Adjusting the interface elements may also include eliminating or expanding questions as well as altering question style, tone, and/or content. For example, adjusting the interface elements may include changing the tone of the application to a more calming, soothing tone in order to reduce anger and hostility.

Figure 11:
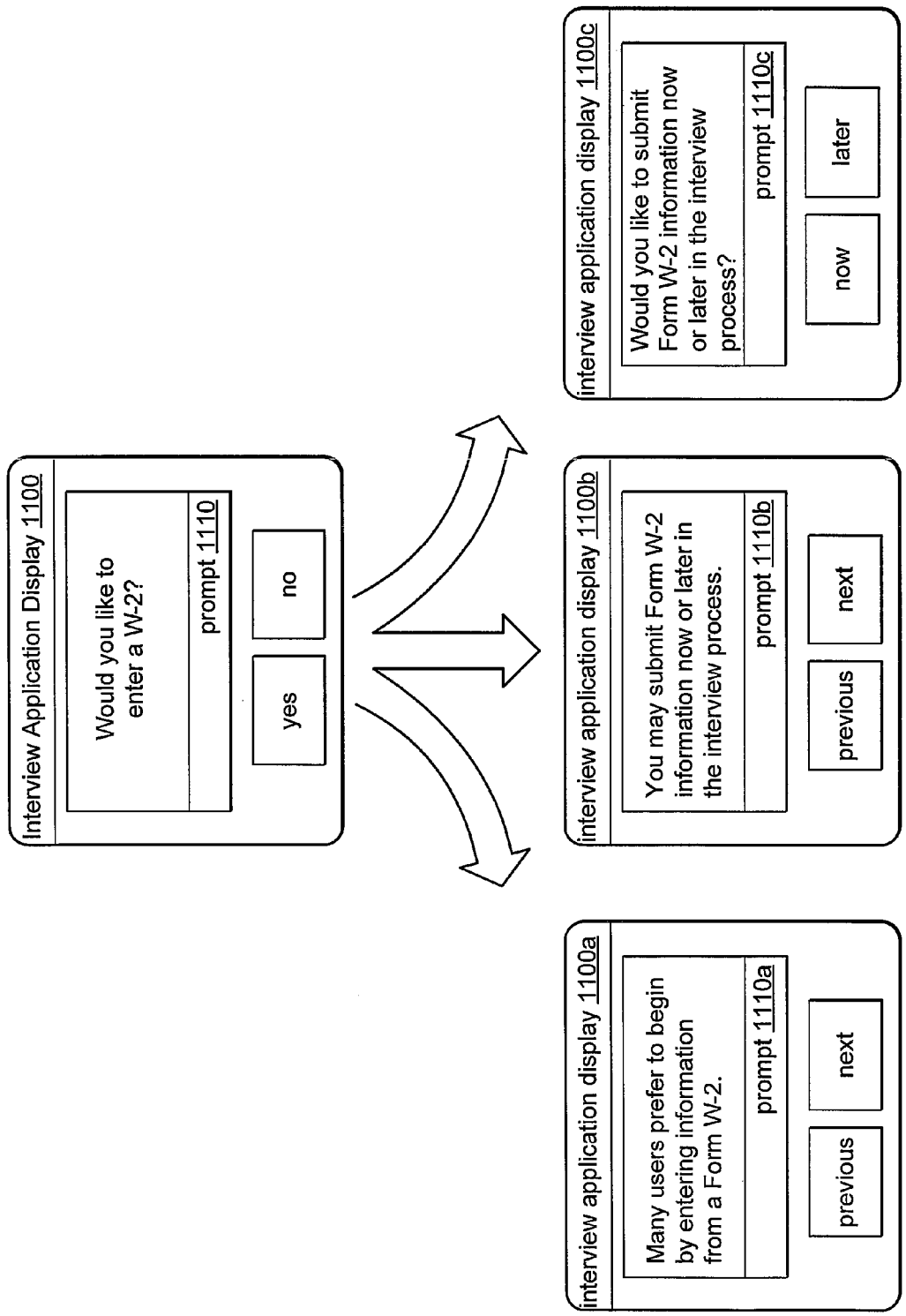
FIG. 11 illustrates an exemplary series of application displays.

One example of adjusting an application in response to a user's mood state is illustrated by the application displays of FIG. 11. The modifications illustrate in FIG. 11 may be implemented by a mood state component, such as mood state component 100. The interview application display 1100 may be, for example, part of a tax preparation application. The display may include a direct question, such as illustrated by prompt 1110. While some users, may prefer this style of questioning, other users may become tense or anxious (or any other mood state characteristic) when presented with this style of questioning. Such tension-anxiety may be detected by a mood state component, such as mood state component 100, which may alter the application to reduce the user's anxiety. For example, the mood state component may break up the question presented by display 1100 into multiple displays, such as interview application displays 1100a-1100c. Interview application displays 1100a-1100c and prompts 1110a-1110c provide more context information to the user in an effort to correct the user mood state, such as by reducing the user's anxiety level and making the user feel more comfortable. Additionally, in an effort to correct the users mood state (e.g., reducing the user's anxiety), each screen may be presented to the user at a slower pace such that the user has more time to process the information.

One example of a display that may be used throughout the various methods described herein includes interview application display 1200 of FIG. 12. Prompt 1210 may include one or more mood state profiling questions, such as questions 1215. In various embodiments, the mood state profiling questions may have been validated against known mood state profiling scales, such as questions of the POMS, BAI, or PANAS clinical assessment tools. Display 1200 may be a display that is presented to the user before, during, or after using an application. Display 1200 may be implemented within a deployed application (e.g., final product) or during the software development phase, such as during application profiling. In various embodiments, the exemplary interview application display 1300 may be implemented by a mood state component, such as mood state component 100. Prompt 1310 may include normal application content. For example, if the mood state component is implemented within a tax preparation application, prompt 1310 may contain content related to the tax interview process. Pop-up display 1320 may be implemented so as not to interfere with the normal content of the application. By not severely interfering with a given task, pop-up display 1320 may facilitate evaluating a user's mood state while the user is actually engaged in a particular task (e.g., a task related to the content of prompt 1310). In many cases, this may provide more accurate mood state results than evaluating the user's mood state after the task. For example, many users may have a negative mood state during a difficult task and a positive mood state after the difficult task due to the positive feelings that accompany accomplishing a hard task. Pop-up display may include one or more mood state profiling questions 1315. In various embodiments, the mood state profiling questions may have been validated against known mood state profiling scales, such as questions of the POMS, BAI, or PANAS clinical assessment tools.

In various embodiments, the system and method for adapting software elements based on mood state profiling may be implemented within interactive voice response applications (e.g., voice mail systems or voice driven menu systems). For example, in some cases, a mood state component, such as mood state component 100, may be implemented within an interactive voice response application to detect a user's mood state and alter elements of the interactive voice response application in response to the user's mood state. For instance, a mood state component may analyze a user's navigation through an interactive voice response application and determine that the user is frustrated or confused (e.g., the user is frequently retracing through numerous pathways of the application). In response, the mood state component may alter content of the interactive voice response application. For instance, the mood state component may alter voice prompts such that more context information is provided to the user.

Exemplary System

Various embodiments of a system and method for adapting software elements based on mood state profiling, as described herein, may be executed on one or more computer systems, which may interact with various other devices. One such computer system is computer system 1400 illustrated by FIG. 14. Computer system 1400 may be capable of implementing a mood state component, such as mood state component 100, and one or more applications, such as interview based applications. In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, and display(s) 1480. In some embodiments, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1410, or a multiprocessor system including several processors 1410 (e.g., two, four, eight, or another suitable number). Processors 1410 may be any suitable processor capable of executing instructions. For example, in various embodiments processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store program instructions 1422 and/or data 1432 accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a mood state component and associated application, such as mood state component 100 and application 190 described above, are shown stored within system memory 1420 as mood state component 1425 and application 1426, respectively. Additionally, data 1432 may include one or more mood state profiles, such as mood state profile 105, and one or more application profiles, such as the application profiles described in regard to FIG. 2. In other embodiments, program instructions and/or data may be received, sent or stored upon different types of computer-accessible media or on similar media separate from system memory 1420 or computer system

1400. Generally speaking, a computer-accessible medium may include storage media or memory media such as magnetic or optical media, e.g., disk or CD/DVD-ROM coupled to computer system 1400 via I/O interface 1430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1440.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network, such as other computer systems, or between nodes of computer system 1400. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANS, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or accessing data by one or more computer system 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

Figure 14:
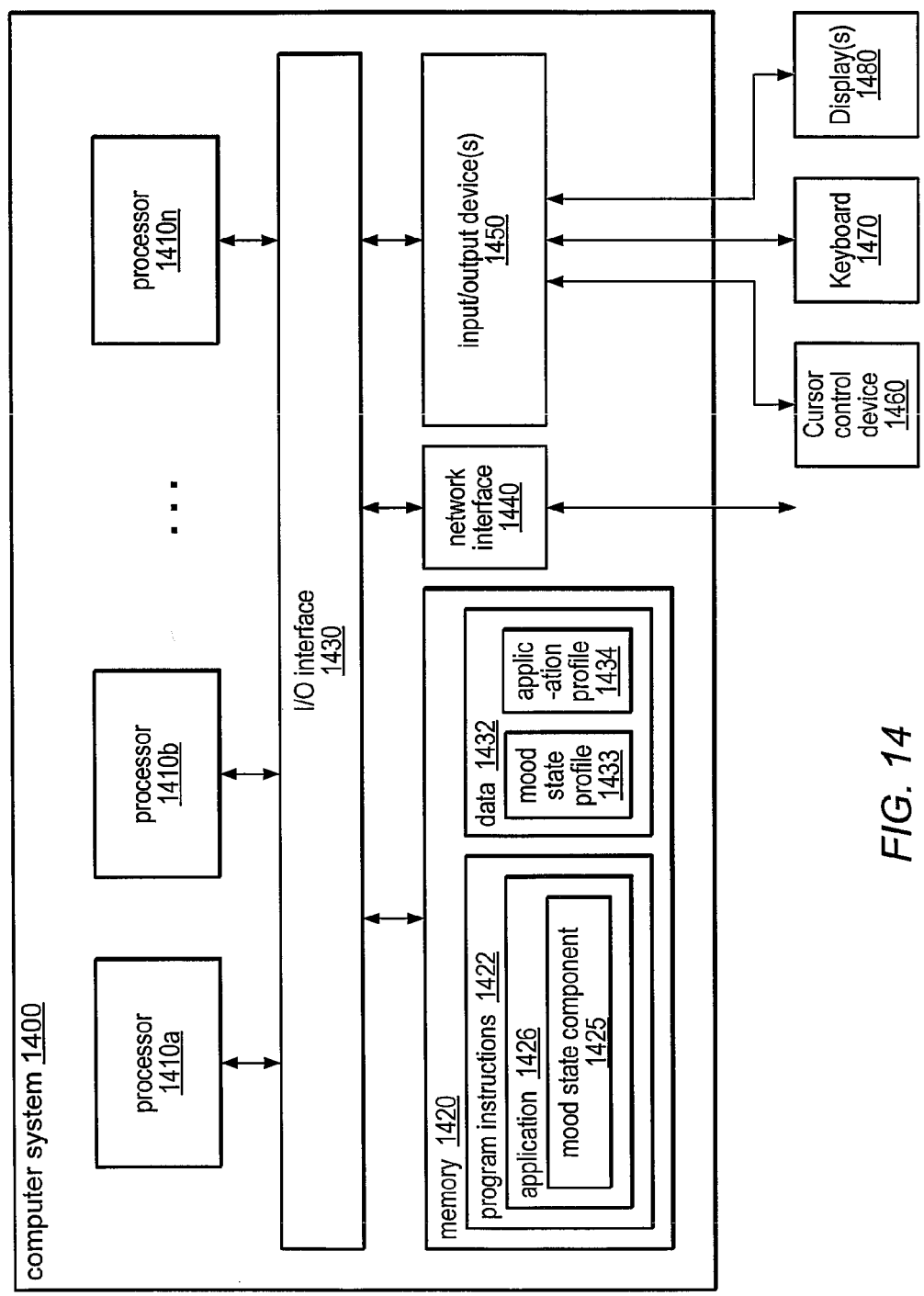
FIG. 14 illustrates a computing system suitable for implementing a mood state component, according to one embodiment.

As shown in FIG. 14, memory 1420 may include program instructions 1422 configured to implement a mood state component, such as mood state component 100, and application 1426, similar to application 190. In one embodiment, mood state 25 component 1425 may implement the various figures illustrated in FIGS. 2, 3, 4, and 10. In other embodiments, different elements and data may be included.

Those skilled in the art will appreciate that computer system 1400 is merely illustrative and is not intended to limit the scope of the present invention. In particular, the computer system and devices may include any combination of hardware or software that can perform the indicated functions, including computers, network devices, Internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods may be implemented in software, hardware, or a combination thereof, in different embodiments. In addition, the order of method may be changed, and various elements may be added, reordered, combined, omitted, modified, etc. Various modifications and changes may be made as would be obvious to a person skilled in the art having the benefit of this disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A system, comprising:
a processor; and
a memory coupled to the processor, wherein the memory comprises program instructions executable by the processor to implement a user mood state component configured to:
receive a plurality of information for a plurality of characteristic values associated with a first user mood state of a user;
determine, using the plurality of information for the plurality of characteristic values, the first user mood state of the user by:
determining a user's navigational performance of an application; and
determining the first user mood state of the user from the user's navigational performance;
determine that the first user mood state differs from a desired mood state of the user;
alter an element of the application to generate an altered element; and
generate, using the altered element of the application, a second user mood state of the user, wherein the second user mood state differs from the first user mood state, and wherein the second user mood state approximates the desired mood state of the user.

2. The system of claim 1, wherein the user mood state component is configured to create a user mood state profile configured to indicate the first user mood state of the user.

3. The system of claim 2, wherein the user mood state profile comprises one or more mood subscales.

4. The system of claim 1, wherein the application is an interview-based application.

5. The system of claim 1, wherein the first user mood state of the user is further determined by:
presenting to the user, one or more user mood state profiling questions that have been validated against one or more user mood state profiling scales;
receiving one or more responses to the user mood state profiling questions from the user; and
determining the first user mood state of the user from the one or more responses.

6. The system of claim 1, wherein the user mood state component is a component of the application.

7. The system of claim 1, wherein the altered element of the application comprises an alteration of one or more navigation paths of the application.

8. The system of claim 1, wherein the altered element of the application comprises an alteration of one or more user interface elements of the application.

9. The system of claim 1, wherein the first mood state of the user is further determined by:
performing direct observation on the user.

10. A computer-implemented method, comprising:
receiving a plurality of information for a plurality of characteristic values associated with a first user mood state of a user;
determining, using a processor of a computer and the plurality of information for the plurality of characteristic values, the first user mood state of the user by:
determining a user's navigational performance of an application; and
determining the first user mood state of the user from the user's navigational performance;
determining, using the processor of the computer, that the first user mood state differs from a desired mood state of the user;
altering, using the processor of the computer, an element of the application to generate an altered element; and
generating, using the altered element of the application a second user mood state of the user, wherein the second user mood state differs from the first user mood state, and wherein the second user mood state approximates the desired mood state of the user.

11. The computer-implemented method of claim 10, further comprising creating a user mood state profile configured to indicate the first user mood state of the user.

12. The computer-implemented method of claim 11, wherein the user mood state profile comprises one or more mood subscales.

13. The computer-implemented method of claim 10, wherein the application is an interview-based application.

14. The computer-implemented method of claim 10, wherein determining the first user mood state of the user further comprises:
presenting to the user, one or more user mood state profiling questions that have been validated against one or more user mood state profiling scales;
receiving one or more responses to the user mood state profiling questions from the user; and
determining the first user mood state of the user from the one or more responses.

15. The computer-implemented method of claim 10, wherein the altered element of the application comprises an alteration of one or more navigation paths of the application.

16. The computer-implemented method of claim 10, wherein the altered element of the application comprises an alteration of one or more user interface elements of the application.

17. The computer-implemented method of claim 10, wherein determining the first user mood state of the user further comprises:
performing direct observation on the user.

18. A non-transitory computer-readable storage medium, comprising program instructions computer-executable to implement:
receiving a plurality of information for a plurality of characteristic values associated with a first user mood state of a user;
determining, using the plurality of information for the plurality of characteristic values, the first mood state of the user by:
determining a user's navigational performance of an application; and
determining the first user mood state of the user from the user's navigational performance;
determining that the first user mood state differs from a desired mood state of the user;
altering an element of the application to generate an altered element; and
generating, using the altered element of the application, a second user mood state of the user, wherein the second user mood state differs from the first user mood state, and wherein the second user mood state approximates the desired mood state of the user.

19. The non-transitory computer-readable storage medium of claim 18, wherein the program instructions are further executable to implement creating a user mood state profile configured to indicate the first user mood state of the user.

20. The non-transitory computer-readable storage medium of claim 19, wherein the user mood state profile comprises one or more mood subscales.

21. The non-transitory computer-readable storage medium of claim 18, wherein the application is an interview-based application.

22. The non-transitory computer-readable storage medium of claim 18, wherein determining the first user mood state of the user further comprises:
presenting to the user, one or more user mood state profiling questions that have been validated against one or more user mood state profiling scales;
receiving one or more responses to the user mood state profiling questions from the user; and
determining the first user mood state of the user from the one or more responses.

23. The non-transitory computer-readable storage medium of claim 18, wherein the altered element of the application comprises an alteration of one or more navigation paths of the application.

24. The non-transitory computer-readable storage medium of claim 18, wherein the altered element of the application comprises an alteration of one or more user interface elements of the application.

25. The non-transitory computer-readable storage medium of claim 18, wherein determining the first user mood state of the user further comprises:
performing direct observation on the user.

26. A method of application development, comprising:
engaging one or more users in a trial run of an application, wherein the first application is a prototype and wherein the application comprises a plurality of portions with a plurality of desired profiles;
determining a first mood altering characteristic of the application, wherein the first mood altering characteristic generates a first user mood state of the one or more users, wherein the first user mood state is determined by:
determining a user's navigational performance of the application; and
determining the first user mood state of the user from the user's navigational performance;
in response to said determining the first mood altering characteristic, determining a portion of the plurality of portions of the application having a desired profile of the plurality of desired profiles and corresponding to the first mood altering characteristic generating the first user mood state, wherein the first user mood state differs from the desired profile associated with the portion of the application;
modifying the portion of the application to create a second mood altering characteristic; and
generating, using the second mood altering characteristic, a second user mood state of the one or more users, wherein the second user mood state approximates the desired profile for the portion of the application.

27. The method of claim 26, wherein the application is an interview-based application.

28. The method of claim 26, wherein determining the first mood altering characteristic of the application comprises:
creating an application profile comprising the first mood altering characteristic for each of a plurality of segments of the application.

29. The method of claim 28, wherein determining a portion of the plurality of portions of the application corresponding to the first mood altering characteristic comprises accessing the application profile to determine one of the plurality of segments having the first mood altering characteristic.

30. The method of claim 26, wherein the first user mood state is further determined by:
presenting the one or more users with user mood state profiling questions that have been validated against one or more user mood state profiling scales;
receiving responses from the one or more users; and
determining the first user mood state of the one or more users from the responses.

31. The method of claim 26, wherein the first mood state is further determined by:
performing direct observation on the one or more users.

32. The method of claim 26, wherein determining the first mood altering characteristic uses a mood state component configured to:
determine the first user mood state; and
create a corresponding user mood state profile.

33. The method of claim 32, wherein the user mood state profile comprises one or more mood subscales.

\* \* \* \* \*